J. C. PETERS.
RADIATOR HEATING APPARATUS.
APPLICATION FILED MAR. 17, 1917.
1,260,796.
Patented Mar. 26, 1918.
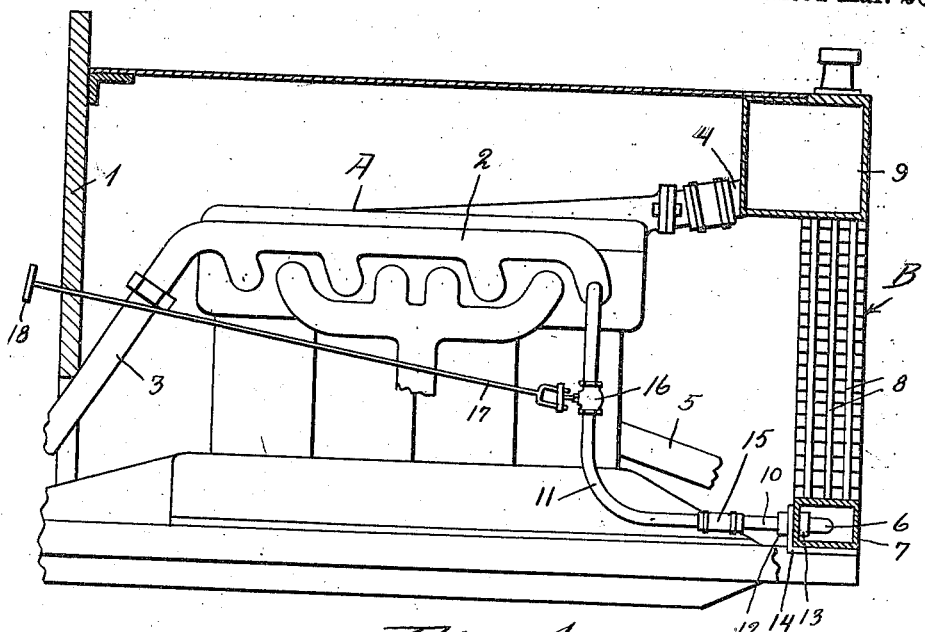
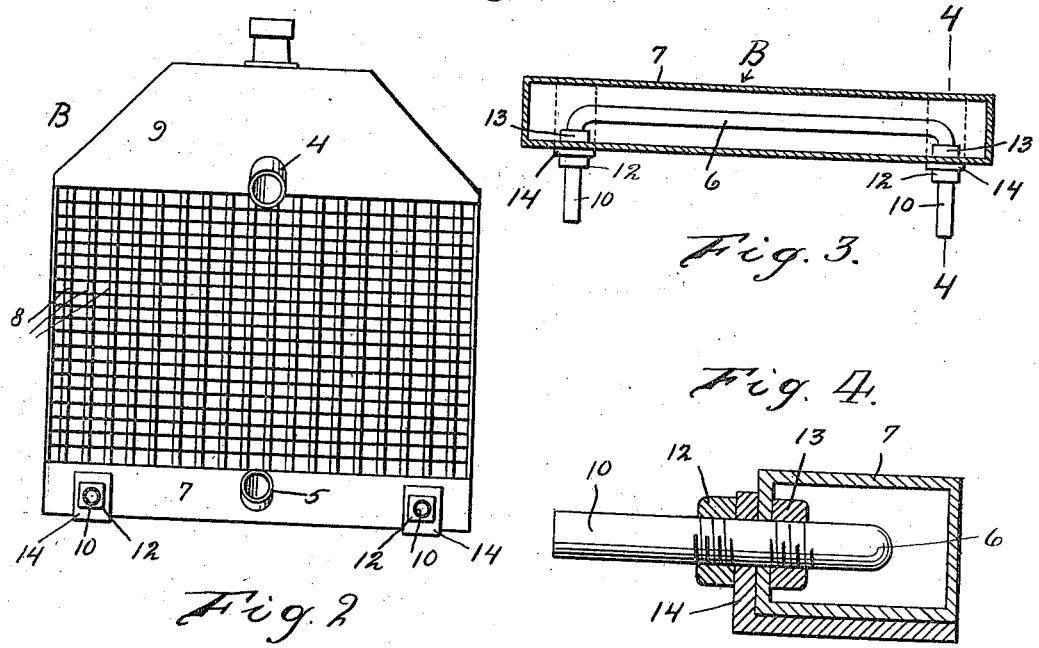
WITNESS
INVENTOR
J. C. Peters
BY Victor J. Evans
ATTORNEY

UNITED STATES PATENT OFFICE.

JOSEPH C. PETERS, OF PAYNESVILLE, MINNESOTA.

RADIATOR-HEATING APPARATUS.

1,260,796.  Specification of Letters Patent.  Patented Mar. 26, 1918.

Application filed March 17, 1917. Serial No. 155,493.

*To all whom it may concern:*

Be it known that I, JOSEPH C. PETERS, a native-born citizen of the United States, residing at Paynesville, in the county of Stearns and State of Minnesota, have invented new and useful Improvements in Radiator-Heating Apparatus, of which the following is a specification.

This invention relates to radiator heating apparatus, the broad object in view being to provide simple means for effectively heating the water contained in the radiator of the circulatory water system now commonly employed in connection with internal combustion engines, for maintaining the cylinders and other parts of the engine in a comparatively cool and efficient working condition.

More specifically stated, the object of this invention is to utilize the hot exhaust gases from an internal combustion engine mounted upon and carried by the frame of an automobile, for heating the water in the radiator and preventing the said water from freezing, the apparatus being particularly useful in extremely cold weather and especially where the vehicle is allowed to remain standing for a considerable period of time. By means of the heating apparatus herein shown and described, it is only necessary to keep the engine turning over slowly to heat the water in the radiator and prevent said water from freezing.

A further object of the invention is to provide apparatus of the character referred to which may be associated with the power plant of an automobile or similar vehicle either at the time of manufacture or at any time subsequent thereto. The apparatus also embodies means by which the heating apparatus may be thrown out of operation whenever necessary and also to provide for regulating the amount of exhaust gases utilized in heating the water in the radiator, in accordance with variations in the temperature of the atmosphere.

With the above and other objects in view, the invention consists in the novel construction, combination and arrangement of parts, herein described, illustrated and claimed.

In the accompanying drawings:—

Figure 1 is a side elevation showing the radiator heating apparatus in its applied relation to an internal combustion engine and radiator, certain parts of a motor vehicle being illustrated in section.

Fig. 2 is a rear elevation of the radiator, showing heating pipe arranged in the base thereof.

Fig. 3 is a horizontal section taken through the bottom header or compartment of the radiator above the heating pipe.

Fig. 4 is an enlarged fragmentary section on the line 4—4 of Fig. 3.

Referring to the drawings A designates an internal combustion engine which is conventionally shown and B a radiator, the said parts being arranged in the usual relation to each other in front of the dash or cowl 1, the engine embodying as usual the ordinary exhaust manifold 2, exhaust pipe 3, upper water connection 4 and lower water connection 5. The construction thus far described and the relative arrangement of the parts mentioned, are in accordance with the present day automobile or motor vehicle practice.

In carrying out the present invention, I incorporate a heating pipe 6 in the bottom header or lower water compartment 7 of the radiator which compartment, as is well understood by those familiar with the art to which this invention appertains, communicates with the water tubes 8 of the radiator and receives the water therefrom, the tubes 8 communicating as usual with the upper compartment or top header 9 into which the water is conducted through the upper connection 4. The main body of the heating pipe 6 extends longitudinally of and within the bottom compartment or header 7 and the opposite end portions of said heating pipe are deflected substantially at right angles to the pipe 6 to form rearwardly extending terminal portions or legs 10 which extend through the rear wall of the bottom header 7 as shown in Figs. 2 and 3 and sufficiently beyond said rear wall to enable the feed and return pipes 11 to be coupled thereto. The terminal portions or legs 10 of the heating pipe are threaded where they pass through the rear wall of the bottom header 7 and nuts 12 and 13 are threaded thereon and located at the inner and outer sides of the rear wall of the bottom header 7 so as to fixedly hold the heating pipe 6 securely in relation to the bottom header and prevent said heating pipe from working loose and causing a leak. In order to make the connection more secure between the heating pipe 6 and the bottom header 7, I employ reinforcing and strengthening members 14 each in the form of an L-shaped strip of metal of sufficient gage or thickness to fixedly support the legs 10 of the heating pipe 6. The reinforcing members 14 may be soldered, brazed or otherwise permanently secured within the bottom header 7 and it is also preferred to braze or solder the nuts 12 and 13 in place to avoid danger of the heating pipe 7 working loose and causing a leak.

Flexible tubular connections 15 are employed between the legs 10 of the heating pipe 6 and the feed and return pipes 11. This is done to prevent vibration of the last named pipes from being transmitted to the legs 10 which might result in causing the heating pipe and the legs 10 thereof to work loose.

In extremely cold weather, the water in the radiator used in conjunction with an internal combustion engine or a motor vehicle, frequently freezes even while the vehicle is in motion and more frequently freezes when the vehicle is standing still for any considerable period of time. By means of the invention herein shown and described, the exhaust gases are utilized for the purpose of heating the water in the bottom of the radiator, causing an upward trend and circulation of the water toward the top of the radiator as it is heated. The water thus heated in the bottom of the radiator meets the water heated by the engine and delivered to the top header of the radiator. It has been found particularly important to heat the water in the bottom of the radiator as this is a point where the water begins to freeze. This is accomplished by means of the present invention. When the machine is standing idle, it is only necessary to run the engine slowly as this serves to keep the water circulating in the jackets of the engine cylinders heated and also causes a circulation of the hot exhaust gases from the engine through the heating pipe 6 and the legs or terminal portions 10 thereof.

The feed pipe 11 is equipped with a regulating and cut-off valve 16, the stem of which has connected thereto an operating rod 17 which extends rearwardly through the dash or cowl 1 of the vehicle where it is provided with a suitable handle 18. This enables the operator of the machine to adjust the valve 16 so as to regulate the amount of exhaust gases passing to the heating pipe 6 or cut the same off altogether.

I claim:—

The combination with an internal combustion engine, and a radiator associated therewith, of a heating tube inclosed by and submerged in the bottom header of the radiator and having inlet and outlet legs extending through a wall of said header, an exhaust pipe from the engine communicating with one leg of said heating tube, a stop cock controlling said exhaust pipe, L-shaped reinforcing members fixedly mounted in said bottom header and having the legs of the heating tube inserted therethrough, and nuts threaded on said legs upon the inner and outer sides of the wall of said bottom header.

In testimony whereof I affix my signature.

JOSEPH C. PETERS.